(12) United States Patent
Kuwabara et al.

(10) Patent No.: US 8,730,265 B2
(45) Date of Patent: May 20, 2014

(54) CHARACTER GENERATING SYSTEM AND CHARACTER GENERATING METHOD

(75) Inventors: Masao Kuwabara, Tokyo (JP); Naoto Kominato, Tokyo (JP); Yuki Watanabe, Tokyo (JP); Kazumitsu Moriyama, Tokyo (JP)

(73) Assignee: Altron Corporation, Tokyo (JP)

( * ) Notice: Subject to any disclaimer, the term of this patent is extended or adjusted under 35 U.S.C. 154(b) by 14 days.

(21) Appl. No.: 13/371,176

(22) Filed: Feb. 10, 2012

(65) Prior Publication Data

US 2012/0139920 A1  Jun. 7, 2012

Related U.S. Application Data

(63) Continuation of application No. PCT/JP2010/059966, filed on Jun. 11, 2010.

(51) Int. Cl.
*G09G 5/00* (2006.01)
(52) U.S. Cl.
USPC .......................... 345/632; 345/633; 345/426
(58) Field of Classification Search
USPC .......................................... 345/632, 633, 426
See application file for complete search history.

(56) References Cited

U.S. PATENT DOCUMENTS

| 6,122,408 A * | 9/2000 | Fang et al. ..................... 382/274 |
| 6,879,323 B1 * | 4/2005 | Takezawa et al. ............ 345/420 |
| 2006/0001682 A1 | 1/2006 | Honda |

FOREIGN PATENT DOCUMENTS

| JP | 2000-235656 | 8/2000 |
| JP | 2007-104200 | 4/2007 |
| JP | 2007104200 A * | 4/2007 |

\* cited by examiner

*Primary Examiner* — Xiao Wu
*Assistant Examiner* — Steven Elbinger
(74) *Attorney, Agent, or Firm* — Manabu Kanesaka

(57) ABSTRACT

A character generating system (10) includes a pickup image information acquiring unit (14), a texture generating unit (15), and a texture pasting unit (16). The pickup image information acquiring unit (14) acquires face pickup image information corresponding to an image pasting area (51) of a face texture (53) of character (70) from the pickup image information. The texture generating unit (15), on the basis of color information of a difference area (52), sorts pixels in the image pasting area (51), replaces the color information of the selected pixels with the color information of the difference area (52), and generates the face texture (53) from the face pickup image information.

20 Claims, 9 Drawing Sheets

CHARACTER GENERATING SYSTEM AND CHARACTER GENERATING METHOD

RELATED APPLICATIONS

The present application is a Continuation Application of International Application No. PCT/JP2010/059966 filed Jun. 11, 2010.

TECHNICAL FIELD

The present invention relates to a character generating system, and a character generating method that generates a character in a virtual space realized by using a computer. In particular, the present invention relates to a character generating system, and a character generating method that generates a face of a character in a virtual space realized by using a mobile game console on the basis of face pick-up image information of an object.

BACKGROUND ART

As an appearing character displayed in a virtual space of a game or the like realized by using a computer such as a mobile game console, a desired character is selected by a user from a plurality of characters prepared in advance. The selected character is displayed in the virtual spaced as the appearing character.

Furthermore, an image processing apparatus and an image processing method that paste a pickup image photographed with a digital camera or the like and memorized by a user to an appearing character displayed in a virtual space. For example, in Patent Document 1, an image processing apparatus or an image processing method that takes two-dimensional image information, cuts two-dimensional image information in a predetermined region out of the two-dimensional image information by using a clipping region designating frame having a gauge arranged at a position corresponding to a characteristic position of a virtual three-dimensional thing, and pastes the cut-out two-dimensional image information to a virtual three-dimensional thing is disclosed.

PRIOR ART DOCUMENT

Patent Document

Patent Document 1: Japanese Patent Application Laid-open (JP-A) No. 2000-235656

SUMMARY OF THE INVENTION

Problem to be Solved by the Invention

However, as disclosed in Patent Document 1, when two-dimensional image information (face pickup image information) of a face portion is cut out from two-dimensional image information photographed with a digital camera or the like and pasted to a virtual three-dimensional thing (head portion shape model), a region of face pickup image information to be cut is increased in size to cause a shadow formed near the profile portion of the face to be erroneously recognized as flesh color. When the two-dimensional image information is pasted to the head portion shape model, there is such a problem that a shadow is formed at an inappropriate position of a side face so that a visually uncomfortable head portion shape model is generated.

When the region of the face pickup image information to be cut is made smaller than the profile portion of the face to prevent a shadow from being formed near the profile portion of the face, a portion that is not in flesh color (blank portion) is formed near the profile portion of the face. The blank portion is not easily painted out in the flesh color of the portion of the cut-out face pickup image information to eliminate the visually uncomfortable feeling.

The present invention has been made to solve the problems described above, and has as its object to provide a character generating system, a character generating method, and a program that can easily generate a face that is free from a visually uncomfortable feeling in flesh color, face profile, and the like on the basis of face pickup image information of an object photographed with a digital camera e.g. as a face of a character in a virtual space realized by using a computer such as a mobile game console.

Means for Solving the Problem

The following invention will be provided to solve the above conventional problem.

According to the first aspect of the present invention, there is provided a character generating system that generates a face of a character displayed on a display unit as a presence in a virtual space by using a computer on a basis of face pickup image information of an object, wherein the computer includes: pickup image acquiring means that acquires the face pickup image information of the object corresponding to an image pasting area of a face texture of the character from pickup image information of the object stored in a predetermined storing section; texture generating means that replaces information in the image pasting area of the face texture with the face pickup image information of the object acquired by the pickup image acquiring means, paints out a difference region between the entire area of the face texture and the image pasting area in desired color information, replaces pixels in the image pasting area selected on the basis of the desired color information with the desired color information to generate the face texture that is free from a visual boundary between the difference area and the image pasting area; and texture pasting means that pastes a head portion texture having the face texture generated by the texture generating means as a portion to a head portion shape model of the character.

According to the second aspect of the present invention, there is provided a character generating system wherein, in the character generating system according to the first aspect of the present invention, the texture generating means, on the basis of a luminance of the desired color information, selects pixels each having a luminance not less than the luminance in the image pasting area and replaces color information of the selected pixels with the desired color information.

According to the third aspect of the present invention, there is provided a character generating system wherein, in the character generating system according to the first or second aspect of the present invention, the desired color information is color information at a desired position of the face pickup image information.

According to the fourth aspect of the present invention, there is provided a character generating system that generates a face of character displayed on a display unit as a presence in a virtual space by using a computer on a basis of face pickup image information of an object, wherein the computer includes: pickup image acquiring means that acquires the face pickup image information of the object corresponding to an image pasting area of a face texture of the character from pickup image information of the object stored in a predetermined storing section; texture generating means that fits the face pickup image information of the object acquired by the pickup image acquiring means in the entire area of the face texture, when all pixels in a predetermined correction area near a profile portion of the face texture are defined as target pixels respectively, calculates color information of each of the target pixel on the basis of the color information of the pixel in the predetermined region near the target pixel, and generates the face texture in which the color information of the target pixels is replaced with the calculated color information; and texture pasting means that pastes a head portion texture having the face texture generated by the texture generating means as a portion to a head portion shape model of the character.

According to the fifth aspect of the present invention, there is provided a character generating system wherein, in the character generating system according to the fourth aspect of the present invention, the correction area includes a first correction area set near an upper profile portion and a lower profile portion of the face texture, a second correction area set near any one of side-surface profile portions of the face texture, and a third correction area set near the side-surface profile portion opposing the second correction area, and the texture generating means includes first correcting means that, when all the pixels in the correction area are defined as the target pixels respectively, sets first correction color information obtained by calculating an average value of color information of all the pixels, except for the target pixel, which surround the target pixels in a predetermined region as color information of the target pixel, and second correcting means that, when all the pixels in the second correction area and the third correction area are defined as the target pixels, sets second correction color information obtained by calculating an average value of the first correction color information of the predetermined number of pixels except for the target pixels serially arranged from the target pixels toward the side-surface profile portions as color information of the target pixels.

According to the sixth aspect of the present invention, there is provided a character generating system wherein, in the character generating system according to any one of the first to fifth aspects of the present invention, the computer further includes display control means that controls the display unit to display a plurality of pieces of face arrangement guide information representing arrangements of predetermined face parts and the object on the display unit, and image pickup control means that controls an image pickup unit to photograph the object and stores the pickup image information of the object in the predetermined storing unit, and the pickup image acquiring means interlocks the display control means and the image pickup control means, picks up an image of the object on the basis of selected face arrangement guide information selected from the plurality of pieces of face arrangement guide information and having a face matched with the face of the object while displaying the plurality of pieces of face arrangement guide information and the object on the display unit, and acquires the face pickup image information of the object corresponding to the image pasting area of the face texture from the pickup image information of the object stored in the predetermined storing unit on the basis of the selected face arrangement guide information.

According to a seventh aspect of the present invention, there is provided a character generating system wherein, in the character generating system according to the sixth aspect of the present invention, the pickup image acquiring means causes the image pickup control means to adjust a white balance and an exposure on the basis of an image pickup environment of the object such that the pickup image information of the object which is picked by the image pickup control means becomes a bright pickup image information.

According to the eighth aspect of the present invention, there is provided a character generating system wherein, in the character generating system according to any one of the first to seventh aspects of the present invention, the computer further includes input control means that controls an input unit to input various pieces of information including the pickup image information of the object as input information to store the pickup image information of the object in the predetermined storing unit, wherein the pickup image acquiring means interlocks the display control means and the input control means to acquire the face pickup image information of the object corresponding to the image pasting area of the face texture from the pickup image information of the object stored in the predetermined storing unit on the basis of the selected face arrangement guide information selected from the plurality of pieces of face arrangement guide information while displaying the plurality of pieces of face arrangement guide information and the input pickup image information of the object on the display unit.

According to the ninth aspect of the present invention, there is provided a character generating system wherein, in the character generating system according to any one of the sixth to eighth aspects of the present invention, the face parts include at least eyes, a nose, a mouth, and a face profile.

According to the first aspect of the present invention, there is provided a character generating method that generates a face of a character displayed on a display unit as the presence in a virtual space by using a computer on the basis of face pickup image information of an object, wherein the computer includes: (a) the step of acquiring the face pickup image information of the object corresponding to an image pasting area of a face texture of the character from pickup image information of the object stored in a predetermined storing section; (b) the step of replacing information in the image pasting area of the face texture with the face pickup image information of the object acquired in the step (a), painting out a difference region between the entire area of the face texture and the image pasting area in desired color information, replacing pixels in the image pasting area selected on the basis of the desired color information with the desired color information to generate the face texture that is free from a visual boundary between the difference area and the image pasting area; and (c) the step of pasting a head portion texture having the face texture generated in the step (b) as a portion to a head portion shape model of the character.

According to the second aspect of the present invention, there is provided a character generating method wherein, in the character generating method according to the first aspect of the present invention, in the step (b), on the basis of a luminance of the desired color information, pixels each having a luminance not less than the luminance in the image pasting area are selected, and color information of the selected pixels is replaced with the desired color information.

According to the third aspect of the present invention, there is provided a character generating method wherein, in the character generating method according to the first or second aspect of the present invention, the desired color information is color information at a desired position of the face pickup image information.

According to the fourth aspect of the present invention, there is provided a character generating method that generates a face of character displayed on a display unit as the presence in a virtual space by using a computer on the basis of face pickup image information of an object, wherein the computer includes: (a) a step of acquiring the face pickup image information of the object corresponding to an image pasting area of a face texture of the character from pickup image information of the object stored in a predetermined storing section;(b) a step of fitting the face pickup image information of the object acquired in the step (a) into the entire area of the face texture, when all pixels in a predetermined correction area near a profile portion of the face texture are defined as target pixels, calculating color information of the target pixels on the basis of the color information of the pixels in the predetermined region near the target pixels, and generating the face texture in which the color information of the target pixels is replaced with the calculated color information; and (c) a step of pasting a head portion texture having the face texture generated in the step (b) as a portion to a head portion shape model of the character.

According to the fifth aspect of the present invention, there is provided a character generating method wherein, in the character generating method according to the fourth aspect of the present invention, the correction area includes a first correction area set near an upper profile portion and a lower profile portion of the face texture, a second correction area set near any one of side-surface profile portions of the face texture, and a third correction area set near the side-surface profile portion opposing the second correction area, and the step (b) includes a step (b1) of, when all the pixels in the correction area are defined as the target pixels respectively, setting first correction color information obtained by calculating an average value of color information of all the pixels, except for the target pixels, which surround the target pixels in a predetermined region as color information of the target pixel, and a step (b2) of, when all the pixels in the second correction area and the third correction area are defined as the target pixels, setting second correction color information obtained by calculating an average value of the first correction color information of the predetermined number of pixels except for the target pixels serially arranged from the target pixels toward the side-surface profile portions as color information of the target pixels.

According to the sixth aspect of the present invention, there is provided a character generating method wherein, in the character generating method according to any one of the first to fifth aspects of the present invention, the computer further includes, before the step (a), a step (d) of picking up an image of the object on the basis of selected face arrangement guide information selected from the plurality of pieces of face arrangement guide information and having a face matched with the face of the object while displaying the plurality of pieces of face arrangement guide information representing arrangements of predetermined face parts and the object on the display unit and storing the pickup image information of the object in the predetermined storing unit, and, in the step (a), on the basis of the selected face arrangement guide information, the face pickup image information of the object corresponding to the image pasting area of the face texture from the pickup image information of the object stored in the predetermined storing unit.

According to the seventh aspect of the present invention, there is provided a character generating method wherein, in the character generating method according to the sixth aspect of the present invention, in the step (d), a white balance and an exposure are adjusted on the basis of an image pickup environment of the object such that the pickup image information of the object the image of which is picked becomes the bright pickup image information.

According to the eighth aspect of the present invention, there is provided a character generating method wherein, in the character generating method according to any one of aspects of the first to seventh aspects of the present invention, the computer further includes, before the step (a), a step (e) of inputting the pickup image information of the object to store the pickup image information in the predetermined storing unit, and, in the step (a), the face pickup image information of the object corresponding to the image pasting area of the face texture is acquired from the pickup image information of the object stored in a predetermined storing unit on the basis of the selected face arrangement guide information selected from the plurality of pieces of face arrangement guide information while displaying a plurality of pieces of face arrangement guide information representing arrangements of predetermined face parts and the pickup image information of the object input in step (e) on the display unit.

According to the ninth aspect of the present invention, there is provided a character generating method wherein, in the character generating method according to any one of the sixth to eighth aspects of the present invention, the face parts include at least eyes, a nose, a mouth, and a face profile.

According to the first aspect of the present invention, there is a provided program that causes a computer to perform a process of generating a face of a character displayed on a display unit as the presence in a virtual space on the basis of face pickup image information of an object, wherein the computer is caused to execute processing to realize respective means of the character generating system according to any one of the first to ninth aspects of the present invention.

Effect of the Invention

According to the present invention, a face based on face pickup image information of an object photographed with a digital camera or the like and being free from a visually uncomfortable feeling in flesh color, face profile, and the like can be easily generated as a face of a character in a virtual space realized by using a computer such as a mobile game console. A face of a character appearing in a virtual space of a game or the like is generated on the basis of face pickup image information of a user to make it possible to cause a user to empathize more with the character and to make it possible to construct more enjoyable game software.

BEST MODE FOR CARRYING OUT THE INVENTION

An embodiment according to the present invention will be described below with reference to the accompanying drawings. The embodiment to be described later is for an explanation, and does not limit the scope of the present invention. Thus, a person skilled in the art can employ an embodiment in which each of the elements of the present invention or all the elements thereof are replaced with elements equivalents to the above elements. However, the resultant embodiments are included in the scope of the invention.

Figure 1:
FIG. 1 is a diagram showing an example of a character generated by a character generating system according to a first embodiment of the present invention.

A character generating system 10 according to the first embodiment of the present invention is a character generating system that generates, in a virtual space realized by software of a game or the like operating in a computer, a face of a character displayed on a display unit as the presence in the virtual space on the basis of face pickup image information of an object (for example, a user herself/himself). FIG. 1 shows an example of a character 70 in a virtual space realized by game software operating in a mobile game console. The character is generated by the character generating system 10 according to the first embodiment of the present invention.

In this case, the face pickup image information of the object is pickup image information of a face portion in pickup image information of a person the image of which is picked by using a digital camera or the like, may be pickup image information directly acquired from an image pickup unit by using an image pickup unit connected to the computer or built in the computer, or may be pickup image information input from an input unit connected to the computer and obtained by picking up an image in the past. The pickup image information may be image information obtained such that one piece of pickup image information is partially corrected or a plurality of pickup images are synthesized with each other to form one piece of face pickup image information.

A schematic configuration of a computer that executes the character generating system 10 according to the first embodiment of the present invention will be described below. In the embodiment, as the computer, an explanation will be made by using a mobile game console 20.

Figure 2:
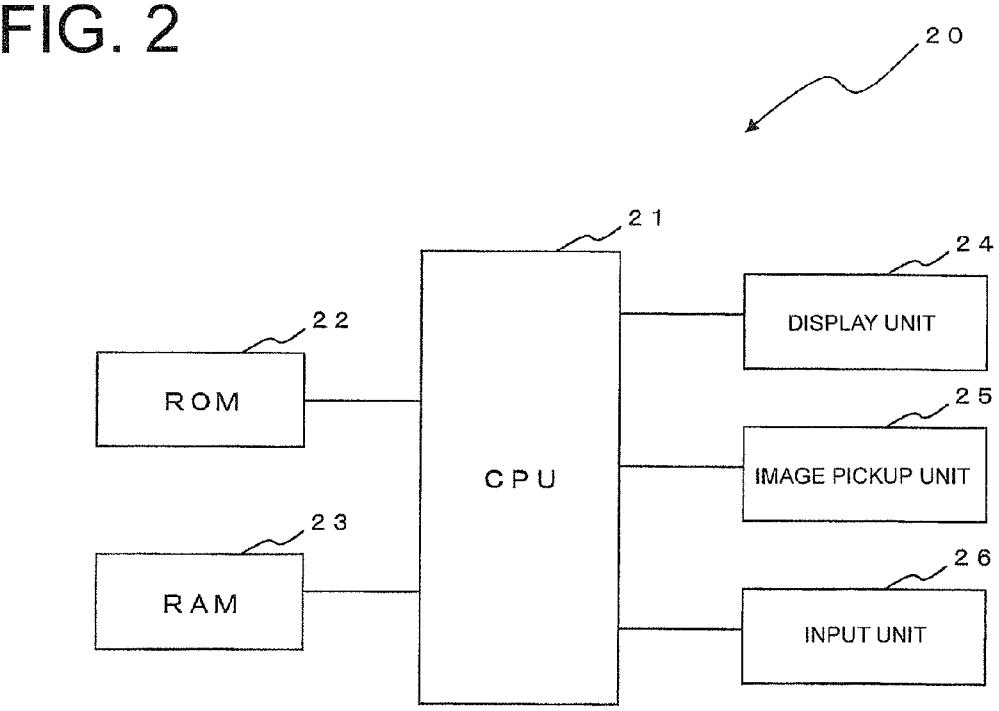
FIG. 2 is a diagram showing a schematic configuration of a mobile video game console that is caused to execute a character generating system according to the first embodiment of the present invention.

FIG. 2 is a diagram showing a schematic configuration of the mobile game console 20 that is caused to execute the character generating system 10 according to the first embodiment of the present invention. As shown in FIG. 2, the mobile game console 20 includes a CPU (Central Processing Unit) 21, a ROM 22, a RAM 23, a display unit 24, an image pickup unit 25, and an input unit 26.

The ROM 22 stores software and data to realize the character generating system 10 executed in the mobile game console 20. The CPU 21 reads necessary information from the ROM 22 and executes so that character generating system 10 is realized. The RAM 23 functions as an execution work area for the software and a storing apparatus for data required to realize the character generating system 10 executed in the mobile game console 20.

Figure 3:
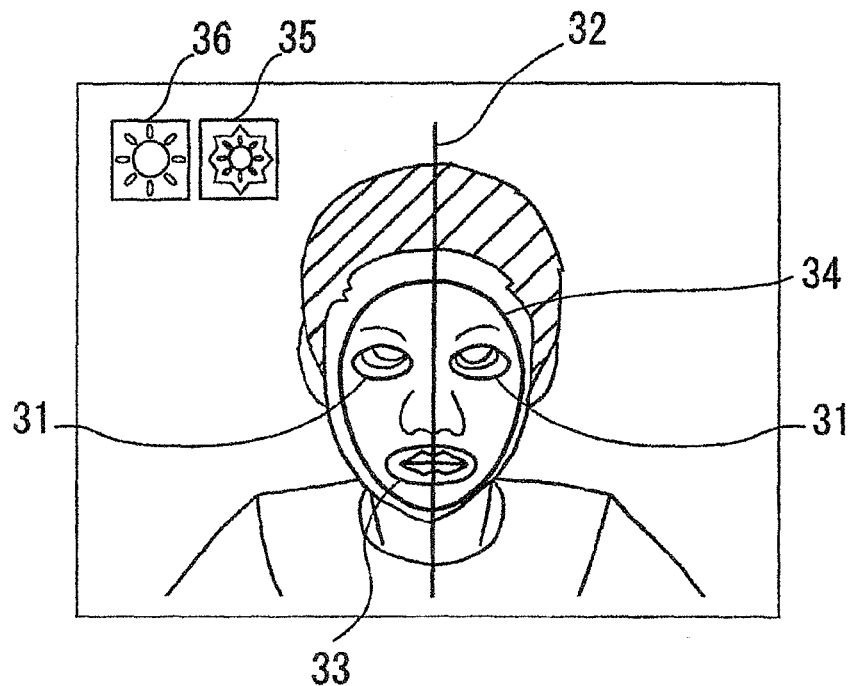
FIG. 3 is a diagram showing an example of a display screen on which face arrangement guide information is displayed.

The display unit 24 outputs display information (for example, information to urge a user to perform an operation, face arrangement guide information, and the like) according to an instruction from the CPU 21. In this case, the face arrangement guide information is, in pickup image information of an object to be photographed, information to set a position reference and a region to take face pickup image information serving as a face portion of the character 70, and display information representing an arrangement of a predetermined face part. The face part is a part such as eyes, a nose, a mouth, a face profile, or eye brows that configure a face, and includes at least eyes, a nose, a mouth, and a face profile. FIG. 3 is an example of a display screen on which the face arrangement guide information is displayed. As shown in FIG. 3, the face arrangement guide information represents eye positions 31, a nose position 32, a mouth position 33, and a face profile 34. The face profile 34 represents a size of a face front portion of the character 70 to which the face pickup image information is pasted.

The image pickup unit 25 picks up an image of an object to be photographed according to an instruction from the CPU 21, and stores the pickup image information of the photographed object in the RAM 23. The input unit 26 is, for example, an operation button, a communication apparatus, an external memory device, or the like, inputs input information (for example, information of an operation button operated by a user, pickup image information, or the like) according to an instruction from the CPU 21, and stores the input information in the RAM 23.

Figure 4:
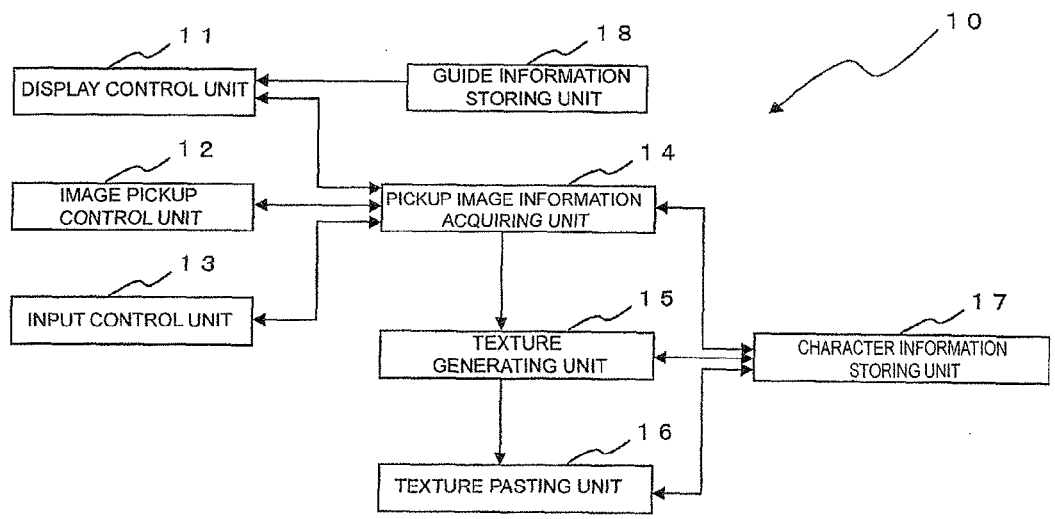
FIG. 4 is a diagram showing an example of a system configuration in the character generating system according to the first embodiment of the present invention.

A system configuration in the character generating system 10 according to the first embodiment of the present invention will be described below. FIG. 4 is a diagram showing an example of a system configuration in the character generating system 10 according to the first embodiment of the present invention.

As shown in FIG. 4, the character generating system 10 includes a display control unit 11, a image pickup control unit 12, an input control unit 13, a pickup image information acquiring unit 14, a texture generating unit 15, a texture pasting unit 16, a character information storing unit 17, and a guide information storing unit 18.

The display control unit 11 controls display unit 24 to take necessary information, such as face arrangement guide information representing an arrangement of a predetermined face part and information to urge a user to perform an operation, from the guide information storing unit 18. Based on necessary information above, the display control unit 11 generates and displays display information. It is noted that the display control unit 11 performs not only the above control but also control of all processes of the display unit 24. The image pickup control unit 12 controls the image pickup unit 25 to pick up an image of the object to be photographed and stores pickup image information of the photographed object in the character information storing unit 17. The input control unit 13 controls the corresponding input unit 26 to input various pieces of input information (for example, pickup image information photographed in the past e.g.) and stores necessary information in the character information storing unit 17. Although the pickup image information of the object to be photographed is stored in the character information storing unit 17 here, the pickup image may be stored in a temporary storing unit.

Figure 5A:
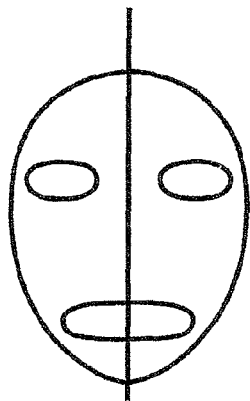
FIGS. 5A, 5B, and 5C are diagrams showing different pieces of face arrangement guide information.
Figure 5B:
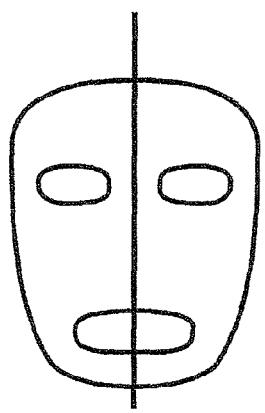
Figure 5C:
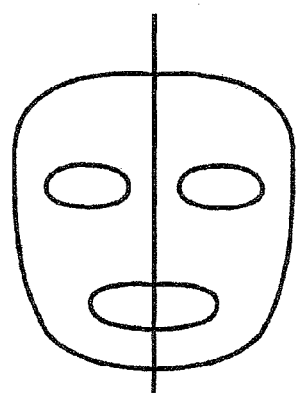

The pickup image information acquiring unit 14 interlocks the display control unit 11 and the image pickup control unit 12 so that the display unit 24 displays a plurality of pieces of face arrangement guide information representing arrangements of predetermined face parts and an object (object to be photographed), a user selects face arrangement guide information (called "selected face arrangement guide information" hereinafter) that is maximally matched with the photogenic object from the plurality of pieces of face arrangement guide information, and the face of the object is picked up so as to match the arrangement of the face parts of the selected face arrangement guide information (see FIG. 3). FIG. 5A to 5C are examples showing different pieces of face arrangement guide information. FIG. 5A shows face arrangement guide information obtained when the face profile is similar to an ellipse, FIG. 5B shows face arrangement guide information obtained when the face profile is similar to a rectangle, and FIG. 5C shows face arrangement guide information obtained when the face profile is similar to a square. The selected face arrangement guide information is face arrangement guide information selected by a user from the plurality of pieces of face arrangement guide information as shown in FIGS. 5A to 5C, for example, the face arrangement guide information in FIG. 5B.

Figure 6:
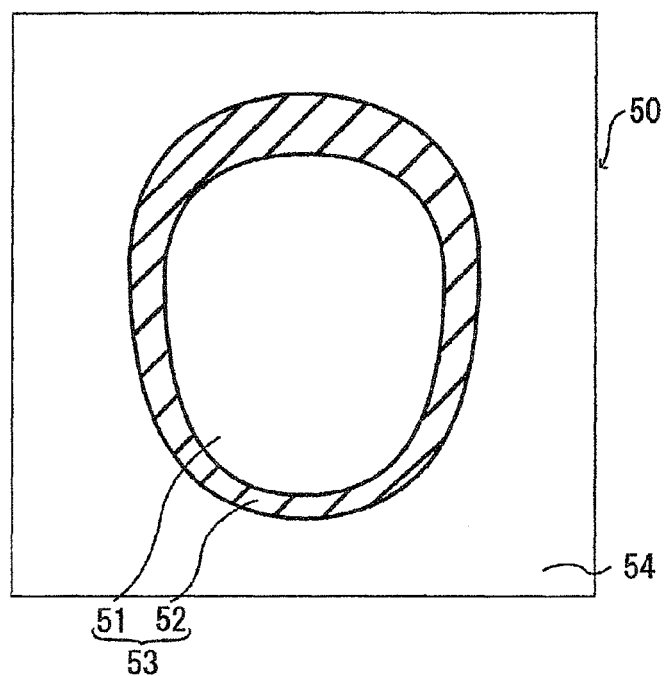
FIG. 6 is a diagram for explaining an image pasting area 51 of a face texture 53.

The pickup image information acquiring unit 14 acquires face pickup image information corresponding to the image pasting area 51 of the face texture 53 in the character 70 from the pickup image information of the object the image of which is picked. FIG. 6 is a diagram for explaining the image pasting area 51 of the face texture 53. As shown in FIG. 6, a head portion texture 50 to be pasted to the head portion shape model 60 (see FIGS. 9A and 9B) of the character 70 includes the face texture 53 and a blank space 54, and the face texture 53 includes the image pasting area 51 and the difference area 52. The image pasting area 51 is an area in which the face pickup image information acquired by the pickup image information acquiring unit 14 is fitted. As shown in FIG. 6, the image pasting area 51 is a partial area smaller than the entire area of the face texture 53. This is to prevent a shadow formed near the face profile portion of a pickup image obtained by picking an image of a face portion from the front side from being recognized as flesh color and to take a pickup image in an area being free from a shadow. An area except for the image pasting area 51 of the face texture 53 is the difference area 52. The size of the image pasting area 51 corresponds to a size of the face profile 34 of the face arrangement guide information described above.

Although the face pickup image information described above is acquired from the pickup image information of the object the image of which is picked by the image pickup unit 25, the face pickup image information may be acquired from the pickup image information of the object to be photographed input from the input unit 26. More specifically, the pickup image information acquiring unit 14 interlocks the display control unit 11 and the input control unit 13 to cause a user to select selected face arrangement guide information from the plurality of pieces of face arrangement guide information while displaying a plurality of pieces of face arrangement guide information representing arrangements of predetermined face parts and the pickup image information of the object to be photographed on the display unit 24. Furthermore, the pickup image information acquiring unit 14 acquires face pickup image information matched with the selected face arrangement guide information while relatively matching the arrangements of the face parts in the selected face arrangement guide information with the arrangements of the face parts in the pickup image information of the object to be photographed.

On the basis of a photographing environment (for example, outside in a fine day, outside in a cloudy day, indoor, type of an applied illumination, and the like), a white balance and an exposure are desirably adjusted by the image pickup control unit 12 to pick up brighter pickup image information of the object to be photographed. In particular, when the mobile game console 20 is used, a user carries the mobile game console 20 to pick up an image of an object to be photographed in various photographing environments. For this reason, it is important that the pickup image information is picked while adjusting the white balance and the exposure. In this manner, when a luminance is used as a sorting reference of replace areas in the image pasting area 51 to be described later, flesh color is made bright to effectively enhance the contrast between eyes, eye brows, the mouth, and the like and the flesh color. As shown in FIG. 3, on the display region 35 and the display region 36, an adjusting state of white balance and an adjusting state of exposure are displayed. The white balance and the exposure may be automatically adjusted by the image pickup control unit 12 on the basis of the photographing environment of the object to be photographed. Alternatively, a user is caused to select a desired state of white balance and a desired state of exposure in the photographing environment. The white balance and the exposure may be caused to be adjusted by the image pickup control unit 12 on the basis of the selected states.

Figure 7:
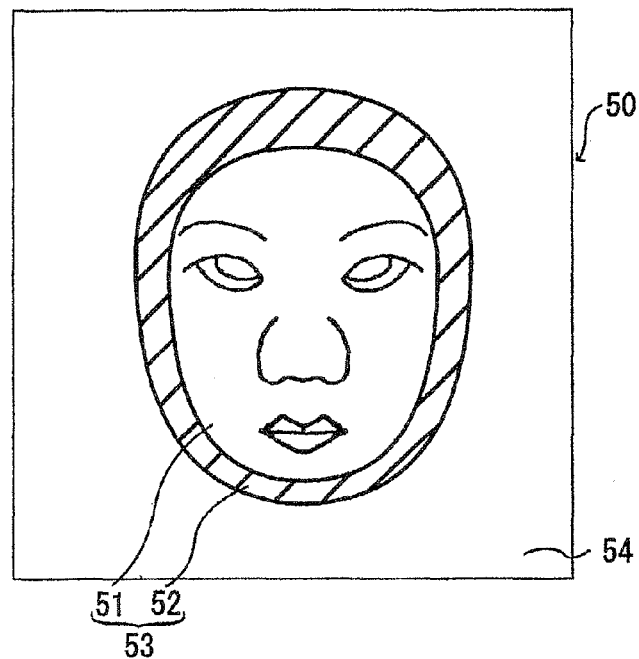
FIG. 7 is a diagram showing a state in which information in the image pasting area 51 of the face texture 53 is replaced with the face pickup image information.

The texture generating unit 15 fit the face pickup image information acquired by the pickup image information acquiring unit 14 in the image pasting area 51 of the face texture 53. More specifically, image information in the image pasting area 51 is replaced with the face pickup image information. FIG. 7 shows a state in which information in the image pasting area 51 of the face texture 53 is replaced with the face pickup image information. When the face pickup image information and the face texture 53 have different data formats, the face pickup image information is converted into a data format of the face texture 53 and then replaced.

The texture generating unit 15 interlocks the display control unit 11 and the input control unit 13 to set color information of the difference area 52 to be a color desired by a user. As the color information of the difference area 52, as a part of the image pasting area 51 in which the face pickup image information is fitted can be set. More specifically, flesh color at an arbitrary position of the face pickup image information can be set as color information of the difference area 52. A color is synthesized by using a painting function (not shown) of the mobile game console 20, and the synthesized color information can also be set. In this case, the color information is information of a color expressed by the RGB format, the YUV format, or the like.

The texture generating unit 15 entirely paints out the difference area 52 with the set color information. More specifically, the color information of all the pixels of the difference area 52 is set to be the set color information. The portion of the blank space 54 is pasted with the set color information. In this manner, the same color information is set in the difference area 52 and the blank space 54.

The texture generating unit 15, on the basis of the color information of the difference area 52, sorts the pixels in the image pasting area 51 and replaces the sorted pixels with the set color information (color information of the difference area 52). Pixels in the image pasting area 51 are target pixels (to be referred to as replacement target pixels hereinafter) used when the pixels in the image pasting area 51 each having a luminance of L0 or more when the luminance (L0) of set color information (color information of the difference area 52) is set to a threshold value are replaced with the set color information (color information of the difference area 52). The replacement target pixels are replaced with the set color information (color information of the difference area 52) to make it possible to adjust flesh color to eliminate a virtual boundary between the difference area 52 and the image pasting area 51. On the other hand, colors each having a low luminance of a face part such as eyes, eye brows, or the mouth, a shadow representing the height of a nose or the like, and things such as a mole that characterizes an identical person are not changed.

Figure 8:
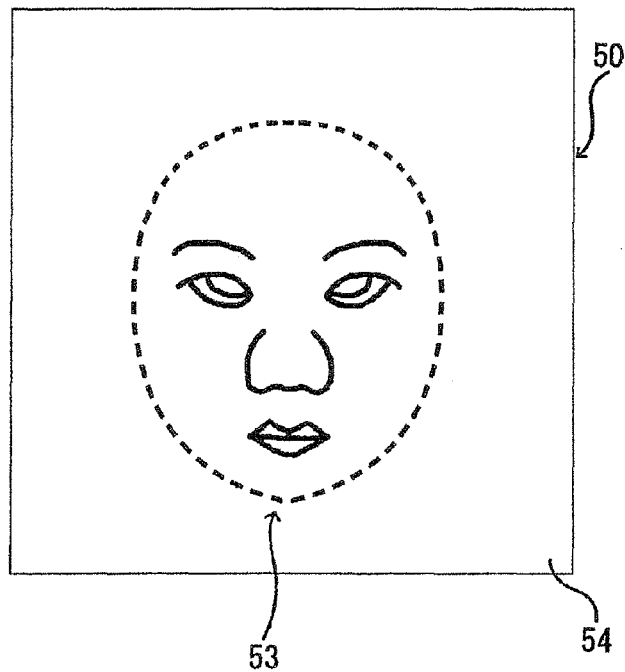
FIG. 8 is a diagram showing the face texture 53 in which flesh color is adjusted to eliminate a visual boundary between a difference area 52 and the image pasting area 51.

As a reference to sort replace target pixels, a luminance is given as an example. However, the reference is not limited to the luminance. However, since the luminance can easily sort replacement target pixels and can adjust flesh color to eliminate a virtual boundary between the difference area 52 and the image pasting area 51, the luminance is preferably used as the sorting reference. FIG. 8 is a diagram showing the head portion texture 50 including, as a portion, the face texture 53 in which flesh color is adjusted to eliminate a visual boundary between the difference area 52 and the image pasting area 51.

Make up or hand-written glasses is applied to the face texture 53 by using a painting function to also make it possible to perform partial color correction. A plurality of face parts are stored in the character information storing unit 17 in advance, and face parts of an object to be photographed are replaced with desired face parts to make it possible to perform face correction.

In this manner, the texture generating unit 15 generates the face texture 53 (head portion texture 50) from the face pickup image information of the object to be photographed. The generated face texture 53 (head portion texture 50) is stored in the character information storing unit 17.

Figure 9A:
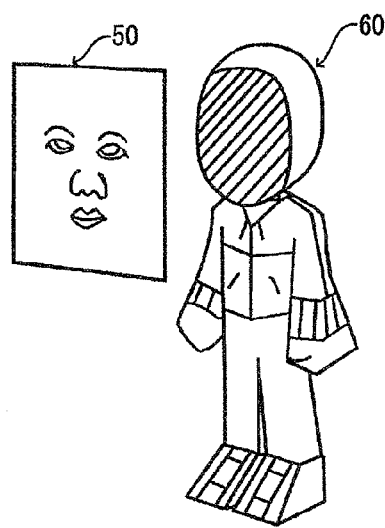
FIG. 9A is a diagram showing a state of a head portion shape model 60 before the face texture 53 is pasted thereto.
Figure 9B:
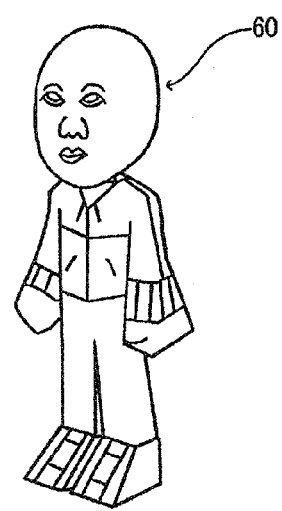
FIG. 9B is a diagram showing a state of the head portion shape model 60 after the face texture 53 is pasted thereto.

The texture pasting unit 16 takes the head portion shape model 60 stored in the character information storing unit 17 in advance and pastes the head portion texture 50 including, as a portion, the face texture 53 generated by the texture generating unit 15 to the taken head portion shape model 60. FIG. 9A is a diagram showing a state of the head portion shape model 60 obtained before the head portion texture 50 is pasted, and FIG. 9B is a diagram showing a state of the head portion shape model 60 obtained after the head portion texture 50 is pasted.

A plurality of parts corresponding to hair style, clothes, accessories, and the like are stored in the character information storing unit 17 in advance depending on situations of a game or the like. A user can be caused to select desired parts, and existing parts can also be set. As the head portion shape model 60, a preset fixed head portion shape model may be taken out of the character information storing unit 17. The head portion shape model may be selected from and taken out of a plurality of head portion shape models stored in the character information storing unit 17.

The activation timing of the character generating system 10 according to the first embodiment of the present invention will be described below. The activation timing of the character generating system 10 according to the first embodiment of the present invention, for example, in a role-playing game (RPG), before the RPG is started, not only faces of all characters appearing in a virtual space of the RPG before the RPG is started by activating the character generating system 10, but also, in the middle of game progress of the RPG, the character generating system 10 is operated when a new character appears in the virtual space to make it possible to generate the face of the appearing character. More specifically, at an activation timing desired by the user, the character generating system 10 can be activated.

In the character generating system 10 according to the first embodiment of the present invention described above, as a face of the character 70 in the virtual space realized by using the mobile game console 20, a face that is free from a visually uncomfortable feeling in flesh color, face profile, and the like on the basis of the face pickup image information of the object photographed with the image pickup unit 25 can be easily generated. When the face of the character 70 appearing in the virtual space of the game or the like is generated on the basis of the face pickup image information of a user 90, the user 90 can more empathize with the character 70 to make it possible to construct enjoyable game software.

Figure 10:
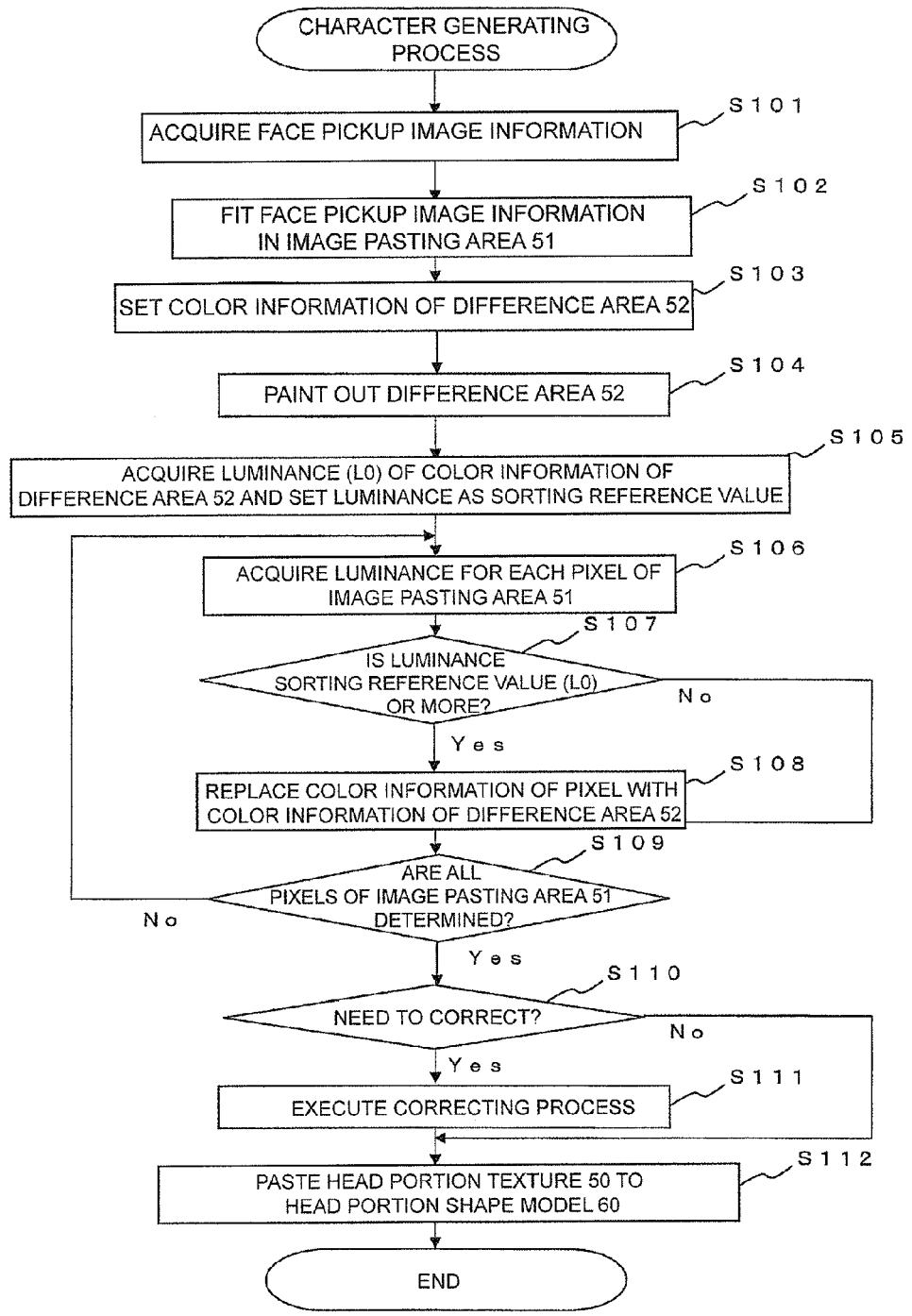
FIG. 10 is an example of a flow chart showing procedures of a program that causes a computer to execute each of steps in a character generating method according to the first embodiment of the present invention.

A character generating method according to the first embodiment of the present invention will be described below. FIG. 10 is an example of a flow chart showing procedures of a program that causes a computer to execute steps of the character generating method according to the first embodiment of the present invention.

As shown in FIG. 10, in generation of a character, face pickup image information serving as an object of a face of the character (step 101: S101). In this case, the user is caused to select selected face arrangement guide information from the plurality of pieces of face arrangement guide information representing the arrangements of the predetermined face parts while displaying the plurality of pieces of face arrangement guide information representing the predetermined face parts and the object to be photographed on the display unit 24, the image of the face of the object to be photographed is picked up with the image pickup unit 25 according to the arrangement of the face parts of the selected face arrangement guide information to acquire the pickup image information of the object the image of which is picked up. Furthermore, the face pickup image information corresponding to the image pasting area 51 of the face texture 53 of the character is acquired from the pickup image information of the object the image of which is picked up. In this case, the pickup image information of the object the image of which is picked up by the image pickup unit 25 is used. However, the pickup image information input from the input unit 26 may be used. Image information of one piece of face pickup image information obtained by partially correcting one piece of pickup image information or synthesizing a plurality of pickup images with each other may be used. On the basis of the photographing environment of the object to be photographed, a white balance and an exposure are adjusted to acquire bright pickup image information of the object to be photographed.

The face pickup image information is fitted in the image pasting area 51 of the face texture 53 (step 102: S102). More specifically, the image information of the image pasting area 51 is replaced with the face pickup image information. At this time, when the face pickup image information and the face texture 53 have different data formats, the face pickup image information is converted into the data format of the face texture 53 and then replaced.

Color information of the difference area 52 is set (step 103: S103). For example, a part of the image pasting area 51 in which the pickup image information is fitted is designated, and the designated color information is set as color information of the difference area 52. For example, color information synthesized by a painting function is set as the color information of the difference area 52.

The difference area 52 is entirely painted out with the color information set in step S103 (step 104: S104). More specifically, the color information of all the pixels of the difference area 52 is set to set color information. The portion of the blank space 54 is painted out with the set color information. A luminance (L0) of the set color information of the difference area 52 is acquired and set to a sorting reference value (step S105: S105). In this case, the luminance is a target of the sorting reference value. However, the target is not limited to the luminance.

Luminances of the pixels in the image pasting area 51 are taken in units of pixels (step 106: S106), and it is determined whether the taken luminances of the pixels are the sorting reference value (L0) (step 107: S107) or more. When the taken luminances of the pixels are the sorting reference value (L0) or more (S107: Yes), the taken color information of the pixels are replaced with the set color information of the difference area 52 (step 108: S108). Steps 106 to 108 are performed to all the pixels in the image pasting area 51 (step 109: S109). With the above processes, the face texture 53 (head portion texture 50) is generated.

It is determined whether the face texture 53 needs to be corrected (step 110: S110). The correction of the face texture 53 includes, for example, a process of applying makeup, hand-written glasses, or the like to the face texture 53 by using a painting function to perform partial color correction or a process of replacing the face parts of the object to be photographed with face parts stored in the character information storing unit 17 in advance so as to perform face correction. When the face texture 53 needs to be corrected (S110: Yes), the processes corresponding to the correction are applied to the face texture 53 (step 111: S111).

Finally, the head portion texture 50 including the generated face texture 53 as a portion is pasted to the head portion shape model 60 prepared in advance (step 112: S112). In this manner, the character 70 to which the face of the object to be photographed is pasted is generated.

In the character generating system according to the first embodiment of the present invention described above, as a face of the character 70 in a virtual space realized by using the mobile game console 20, a face that is based on the face pickup image information of the object the image of which is picked with the image pickup unit 25 and that is free from a visually uncomfortable feeling in flesh color, face profile, and the like can be easily generated. When the face of the character 70 appearing in the virtual space of the game or the like is generated on the basis of the face pickup image information of the user 90, the user 90 can more empathize with the character 70 to make it possible to construct enjoyable game software.

A character generating system according to the second embodiment of the present invention will be described below. Since a schematic configuration of the mobile game console 20 that executes a character generating system 110 according to the second embodiment of the present invention is a schematic configuration of the mobile game console 20 that executes the character generating system 10 according to the first embodiment of the present invention shown in FIG. 2, a description thereof will be omitted.

Figure 11:
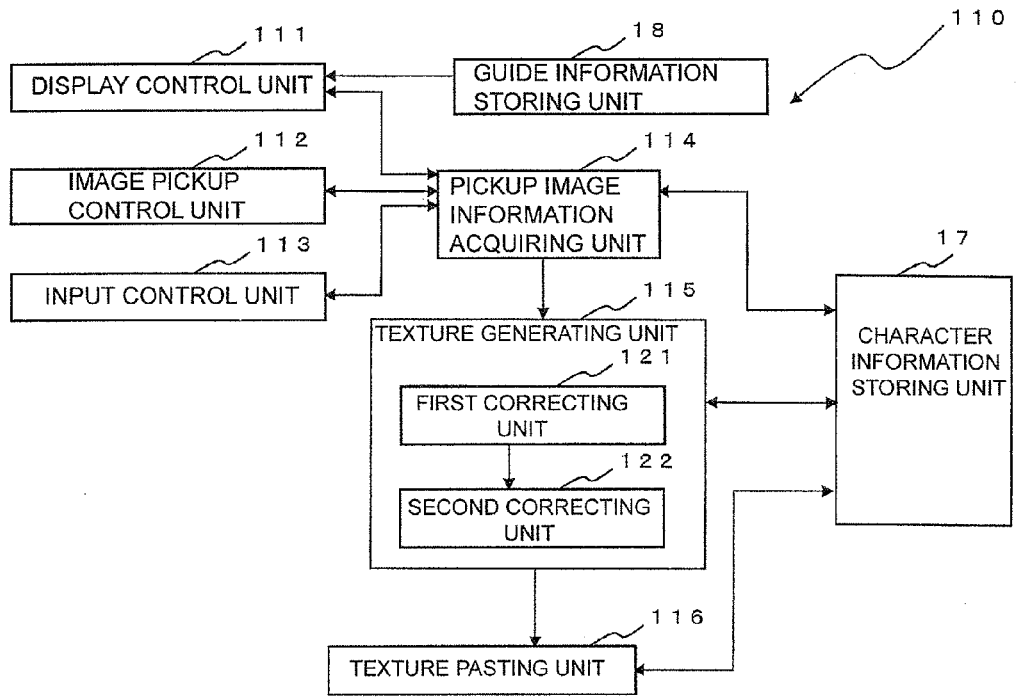
FIG. 11 is a diagram showing an example of a system configuration in the character generating system according to a second embodiment of the present invention.

A system configuration in the character generating system 110 according to the second embodiment of the present invention will be described below. FIG. 11 is a diagram showing an example of a system configuration in the character generating system 110 according to the second embodiment of the present invention.

As shown in FIG. 11, the character generating system 110 includes a display control unit 111, a pickup image control unit 112, an input control unit 113, a pickup image information acquiring unit 114, a texture generating unit 115, a texture pasting unit 116, a character information storing unit 17, and a guide information storing unit 18. Furthermore, the texture generating unit 115 includes a first correcting unit 121 and a second correcting unit 122. The display control unit 111, the pickup image control unit 112, the input control unit 113, and the texture pasting unit 116 of the character generating system 110 have the same functions as those of the display control unit 11, the image pickup control unit 12, the input control unit 13, and the texture pasting unit 16 of the character generating system 10 described in FIG. 4, and a description thereof will be omitted.

The pickup image information acquiring unit 114 interlocks the display control unit 111 and the pickup image control unit 112 to display a plurality of pieces of face arrangement guide information representing arrangements of predetermined face parts and an object (object to be photographed) on the display unit 24, and causes a user to select selected face arrangement guide information that is maximally matched with the object to be photographed from the plurality of pieces of face arrangement guide information to pick an image of a face of the object to be photographed according to arrangements of face parts of the selected face arrangement guide information (see FIG. 3).

The pickup image information acquiring unit 114 acquires face pickup image information corresponding to the entire area of the face texture 53 in the character 70 from the pickup image information of the object the image of which is picked. More specifically, the face pickup image information acquired from the pickup image information of the object the image of which is picked is the face pickup image information corresponding to the image pasting area 51 of the face texture 53 in the character generating system 10 according to the first embodiment of the present invention. However, in the character generating system 110 according to the second embodiment of the present invention, the face pickup image information acquired from the pickup image information of the object the image of which is picked is the face pickup image information corresponding to the entire area of the face texture 53.

The texture generating unit 115 fits the face pickup image information acquired by the pickup image information acquiring unit 114 in the entire area of the face texture 53. More specifically, the image information of the entire area of the face texture 53 is replaced with the face pickup image information. Furthermore, a shadow or the like reflected near the face profile portion is corrected, and a blurring process for the profile portion is performed to the face texture 53.

The correcting process for the face texture 53 replaced with the face pickup image information will be described below. The correcting process is performed against to the face texture 53 above so that the shadow or the like reflected near the face profile portion thereof is corrected and the face profile portion thereof is blurred. It will be explained in detail below.

Figure 12:
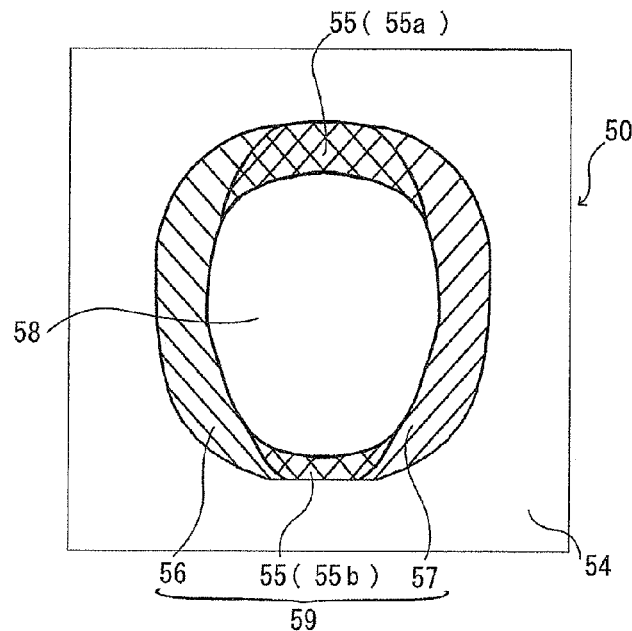
FIG. 12 is a diagram for explaining an area of the face texture 53 that performs a correction process in a texture generating unit 115.

FIG. 12 is a diagram for explaining an area of the face texture 53 that performs the correcting process in the texture generating unit 115. As shown in FIG. 12, the face texture 53 includes a correction area 59 and a non-correction area 58 are set in advance. The correction area 59 is an area near the face profile portion of a pickup image obtained by picking up a face portion from the front side, and is an area in which correction to prevent flesh color from becoming dark due to a shadow, a beard, or the like, a blurring process for the face profile, and the like are performed to color information of pixels obtained from the face pickup image information. The non-correction area 58 is an area in which the face pickup image information acquired by the pickup image information acquiring unit 114 is directly used without performing a correcting process to the face pickup image information. The correction area 59 includes first correction areas 55 set near an upper profile portion and a lower profile portion of the face texture 53, a second correction area 56 set near any one of side-surface profile portions of the face texture 53, and a third correction area 57 set near a side-surface profile portion opposing the second correction area 56.

In FIG. 12, the following explanation will be made on the assumption that an area set near the left side-surface profile portion of the face texture 53 on the observer's left is defined as the second correction area 56, an area set near the right side-surface profile portion of the face texture 53 on the observer's right is defined as the third correction area 57, the first correction area 55 near the upper profile portion of the face texture 53 is defined as an upper first correction area 55a, and the first correction area 55 near the lower profile portion of the face texture 53 is defined as a lower first correction area 55b.

The upper first correction area 55a is an area to correct a shadow of hair on a forehead, and the lower first correction area 55b is an area to correct a profile shadow near a chin, a beard, and the like. The second correction area 56 and the third correction area 57 are areas to perform correction of a shadow of hair on a facial side, a profile shadow, sideburns, and the like or a blurring process for the profile portion.

The correcting process to the correction area 59 is performed by correcting processes in two steps, i.e., a first correcting process and a second correcting process. In the first correcting unit 121 of the texture generating unit 115, the first correcting process is performed. In the second correcting unit 122 of the texture generating unit 115, the second correcting process is performed. The first correcting process is a process performed to all pixels in the correction area 59, and the second correcting process is a process performed to only pixels in the second correction area 56 and the third correction area 57.

Figure 13:
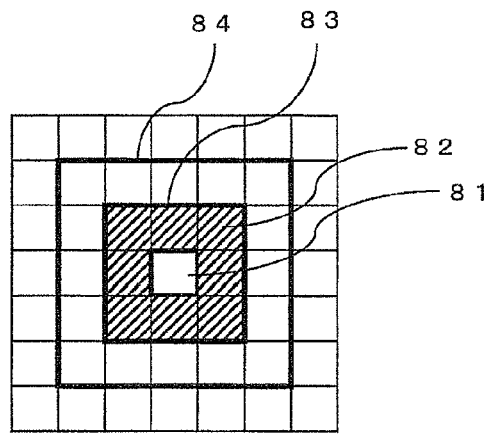
FIG. 13 is a diagram for explaining the first correcting process executed by a first correcting unit 121.

FIG. 13 is a diagram for explaining the first correcting process executed in the first correcting unit 121. As shown in FIG. 13, the first correcting process acquires color information of pixels 82 in the predetermined area 83 surrounding pixels (to be referred to correction target pixels hereinafter) 81 serving as targets of color correction. In FIG. 13, the predetermined area 83 surrounding the correction target pixels 81 is an area configured by eight pixels 82 surrounding the correction target pixels 81. An average value of the pieces of color information of the eight pixels 82 in the acquired area 83 is set as color information of the correction target pixels 81. The color information set by the first correcting process will be called first corrected color information hereinafter. According to the first correcting process, colors of a shadow reflected near the face profile portion, beard, and the like are blurred to make it possible to adjust flesh color to eliminate a visual uncomfortable feeling.

In the specification, a predetermined area surrounding the correction target pixels 81 is the predetermined area 83. However, the predetermined area is not limited to the area 83. For example, the predetermined area may be an area 84 configured by 24 pixels 82 surrounding the correction target pixels 81. However, the predetermined area surrounding the correction target pixels 81 is desirably the area 83 because of a resolution, a processing speed, and the like of the face texture 53.

Figure 14A:
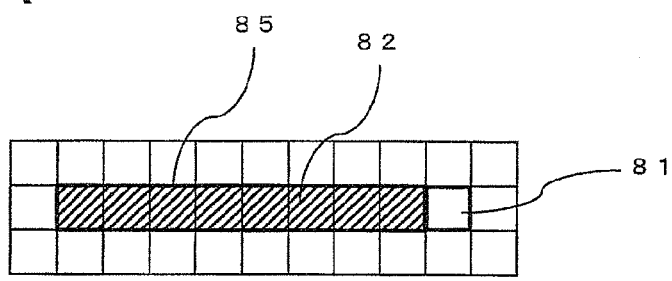
FIG. 14A is a diagram for explaining the second correcting process to a second correction area 56 executed by a second correcting unit 122.
Figure 14B:
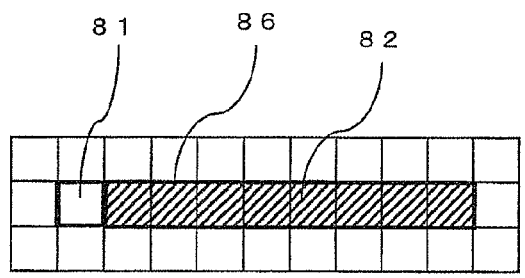
FIG. 14B is a diagram for explaining the second correcting process to a third correction area 57 executed by the second correcting unit 122.

FIGS. 14A and 14B are diagrams for explaining a second correcting process executed by the second correcting unit 122. FIG. 14A is a diagram for explaining the second correcting process to the second correction area 56, and FIG. 14B is a diagram for explaining the second correcting process to the third correction area 57.

In the second correcting process, first corrected color information of a predetermined number of pixels 82 except for the correction target pixels 81 serially arranged from the correction target pixels 81 toward the side-surface profile portions is acquired. More specifically, as shown in FIG. 14A, the first corrected color information of the eight pixels 82 in an area 85 except for the correction target pixels 81 serially arranged from the correction target pixels 81 toward the side-surface profile portion (on the left on the drawing) is acquired for the pixels in the second correction area 56. As shown in FIG. 14B, the first corrected color information of the eight pixels 82 in an area 86 except for the correction target pixels 81 serially arranged from the correction target pixels 81 toward the side-surface profile portion (on the right on the drawing) is acquired from the pixels in the third correction area 57.

In the second correction area 56, the average value of the pieces of first corrected color information of the eight pixels 82 in the acquired area 85 is set as color information of the correction target pixels 81. In the third correction area 57, the average value of the first corrected color information of the eight pixels 82 in the acquired area 86 is set as the color information of the correction target pixels 81. The color information set by the second correcting process is called the second corrected color information. According to the second correcting process, flesh colors in the second correction area 56 and the third correction area 57 are blurred to be close to the flesh color of the face profile portion, and the face profile portion is blurred to make it possible to adjust the flesh color to eliminate a visual uncomfortable feeling near the face side-surface. In the specification, the number of pixels except for the correction target pixels 81 serially arranged from the correction target pixels 81 toward the side-surface profile portion is set to eight. However, the number is not limited to eight.

The texture generating unit 115 performs the correcting process including the first correcting process and the second correcting process to the face texture 53 in which the face pickup image information is fitted. However, before the correcting process, by using the painting function, after reflected hair, reflected shadow, reflected beard, or the like is corrected, the correcting process including the first correcting process and the second correcting process may be performed. Furthermore, after the correcting process is performed, flesh color may be corrected by using the paining function.

The texture generating unit 115 sets color information of pixels in the blank space 54. The color information of the pixels in the blank space 54 may be predetermined color information or may be set on the basis of color information of pixels near the blank space 54 of the correction area 59 subjected to the correcting process described above. For example, the color information of the pixels in the correction area 59 adjacent to the blank space 54 is set to the color information of the pixels in the blank space 54. Furthermore, the first correcting process is performed to all the pixels of the blank space 54 to set the color information of the pixels in the blank space 54.

As described above, the texture generating unit 115 generates the face texture 53 (head portion texture 50) from the face pickup image information of the object to be photographed. The generated face texture 53 (head portion texture 50) is stored in the character information storing unit 17.

The activation timing of the character generating system 110 according to the second embodiment of the present invention will be described below. According to the second embodiment of the present invention, the character generating system 110 can be activated at an activation timing desired by a user. That is, in the second embodiment of the present invention, the activation timing of the character generating system 110 can be adjusted based on a user's requirement, same as the activation timing of the character generating system 10 according to the first embodiment of the present invention.

In the character generating system 110 according to the second embodiment of the present invention described above, as a face of the character 70 in a virtual space realized by using the mobile game console 20, a face that is based on the face pickup image information of the object the image of which is picked with the image pickup unit 25 and that is free from a visually uncomfortable feeling in flesh color, face profile, and the like can be easily generated. When the face of the character 70 appearing in the virtual space of the game or the like is generated on the basis of the face pickup image information of a user 90, the user 90 can more empathize with the character 70 to make it possible to construct enjoyable game software.

Figure 15:
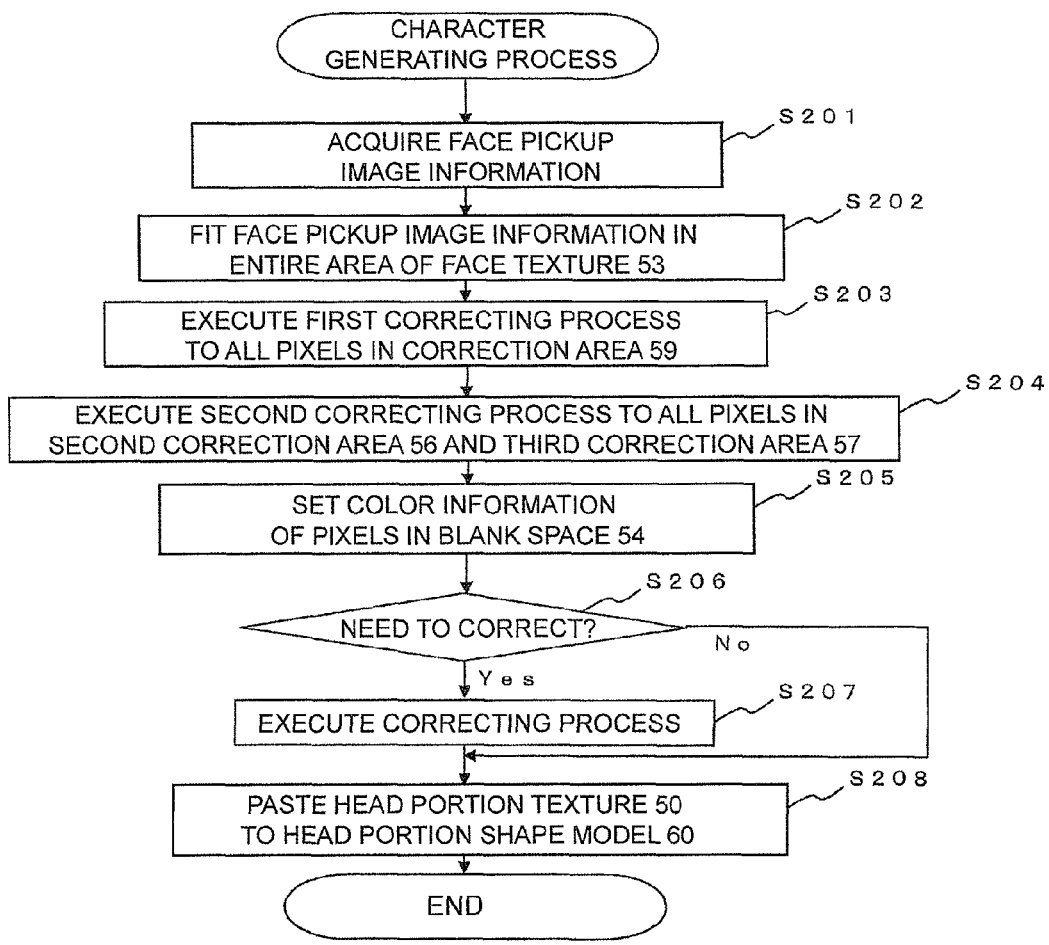
FIG. 15 is an example of a flow chart showing procedures of a program that causes a computer to execute each of steps in the character generating method according to the second embodiment of the present invention.

A character generating method according to a second embodiment of the present invention will be described below. FIG. 15 is an example of a flow chart showing procedures of a program that causes a computer to execute steps in the character generating method according to the second embodiment of the present invention.

As shown in FIG. 15, in generation of a character, face pickup image information serving as a target of a face of the character is acquired (step 201: S201). In this case, while displaying a plurality of pieces of face arrangement guide information representing arrangements of predetermined face parts and an object to be photographed, a user is caused to select selected face arrangement guide information from the plurality of pieces of face arrangement guide information, and a face of an object to be photographed is picked by the pickup unit 25 so as to match the arrangements of the face parts of the selected face arrangement guide information. As a result, the pickup image information of the object to be photographed is acquired. Furthermore, face pickup image information corresponding to the entire area of the face texture 53 of the character is acquired from the pickup image information of the object the image of which is picked.

The face pickup image information is fitted in the entire area of the face texture 53 (step 202: S202). More specifically, the image information of the face texture 53 is replaced with the face pickup image information. At this time, when the face pickup image information and the face texture 53 have different data formats, the face pickup image information is converted into the data format of the face texture 53 and then replaced.

The first correcting process described above is performed to all pixels in the correction area 59 (the first correction area 55, the second correction area 56, and the third correction area 57) to set first corrected color information calculated by the first correcting process (step 203: S203). Before the process in step 203, reflected hair, reflected shadow, reflected beard, and the like may be corrected by using a painting function.

The second correcting process described above is performed to all pixels in the second correction area 56 and the third correction area 57 to set second corrected color information calculated by the second correcting process (step 204: S204). Color information of the pixels in the blank space 54 is set on the basis of the color information of pixels near the blank space 54 of the correction area 59 to which the correcting process is applied (step 205: S205). With the above process, the face texture 53 (head portion texture 50) is generated.

It is determined whether the face texture 53 needs to be corrected (step 206: S206). The correction of the face texture 53 includes, for example, a process of applying makeup, hand-written glasses, or the like to the face texture 53 by using a painting function to perform partial color correction or a process of replacing the face parts of the object to be photographed with face parts stored in the character information storing unit 17 in advance to perform face correction. When the face texture 53 needs to be corrected (S206: Yes), the processes corresponding to the correction are applied to the face texture 53 (step 207: S207).

Finally, the head portion texture 50 including the generated face texture 53 as a portion is pasted to the head portion shape model 60 prepared in advance (step 208: S208). In this manner, the character 70 to which the face of the object to be photographed is pasted is generated.

In the character generating method according to the second embodiment of the present invention described above, as a face of the character 70 in a virtual space realized by using the mobile game console 20, a face that is based on the face pickup image information of the object the image of which is picked with the image pickup unit 25 and that is free from a visually uncomfortable feeling in flesh color, face profile, and the like can be easily generated. When the face of the character 70 appearing in the virtual space of the game or the like is generated on the basis of the face pickup image information of the user 90, the user 90 can more empathize with the character 70 to make it possible to construct more enjoyable game software.

The character generating system 10 according to the first embodiment of the present invention described above and the character generating system 110 according to the second embodiment of the present invention are systems using the mobile game console 20. The present invention is not limited to the above systems but also generation of a two-dimensional or three-dimensional character expressed the presence in a virtual space realized by using a business-use game apparatus (arcade game machine), a home-use game machine, a mobile phone, a stand-alone computer, a workstation computer system, a network computer system, or the like.

REFERENCE NUMERALS 10, 110: Character generating system
11, 111: Display control unit
12, 112: Pickup image control unit
13, 113: Input control unit
14, 114: Pickup image information acquiring unit
15, 115: Texture generating unit
16, 116: Texture pasting unit
17: Character information storing unit
18: Guide information storing unit
50: Head portion texture
51: Image pasting area
52: Difference region
53: Face texture
54: Blank space
55: First correction area
56: Second correction area
57: Third correction area

58: Non-correction area
59: Correction area
60: Head portion shape model
70: Character
121: First correcting unit
122: Second correcting unit

The invention claimed is:

1. A character generating system that generates a face of character displayed on a display unit as the presence in a virtual space by using a computer on the basis of face pickup image information of an object, wherein the computer includes:
   pickup image acquiring means that acquires the face pickup image information of the object corresponding to an image pasting area of a face texture of the character from pickup image information of the object stored in a predetermined storing section;
   texture generating means that fits the face pickup image information of the object acquired by the pickup image acquiring means into an entire area of the face texture, when all pixels in a predetermined correction area near a profile portion of the face texture are defined as target pixels respectively, calculates color information of each of the target pixel on the basis of color information of a predetermined number of pixels, except for the target pixel, serially arranged from the target pixel in the predetermined region, and generates the face texture in which the color information of the target pixels is replaced with calculated color information; and
   texture pasting means that pastes a head portion texture having the face texture generated by the texture generating means as a portion to a head portion shape model of the character.

2. The character generating system according to claim 1, wherein
   the correction area includes a first correction area set near an upper profile portion and a lower profile portion of the face texture, a second correction area set near any one of side-surface profile portions of the face texture, and a third correction area set near the side-surface profile portion opposing the second correction area, and
   the texture generating means includes
   first correcting means that, when all the pixels in the correction area are defined as the target pixels respectively, sets first correction color information obtained by calculating an average value of color information of all the pixels, except for the target pixels, which surround the target pixels in a predetermined region as color information of the target pixel, and
   second correcting means that, when all the pixels in the second correction area and the third correction area are defined as the target pixels, sets second correction color information obtained by calculating an average value of the first correction color information of the predetermined number of pixels except for the target pixels serially arranged from the target pixels toward the side-surface profile portions as color information of the target pixels.

3. The character generating system according to claim 2, wherein the computer further includes
   display control means that controls the display unit to display a plurality of pieces of face arrangement guide information representing arrangements of predetermined face parts and the object on the display unit, and
   image pickup control means that controls an image pickup unit to photograph the object and stores the pickup image information of the object in the predetermined storing unit, and
   the pickup image acquiring means interlocks the display control means and the image pickup control means, picks up an image of the object on the basis of selected face arrangement guide information selected from the plurality of pieces of face arrangement guide information and having a face matched with the face of the object while displaying the plurality of pieces of face arrangement guide information and the object on the display unit, and acquires the face pickup image information of the object corresponding to the image pasting area of the face texture from the pickup image information of the object stored in the predetermined storing unit on the basis of the selected face arrangement guide information.

4. The character generating system according to claim 3, wherein the pickup image acquiring means causes the image pickup control means to adjust a white balance and an exposure on the basis of an image pickup environment of the object such that the pickup image information of the object the image of which is picked by the image pickup control means is the bright pickup image information.

5. The character generating system according to claim 3, wherein the face parts include at least eyes, a nose, a mouth, and a face profile.

6. The character generating system according to claim 2, wherein the computer further includes input control means that controls an input unit to input various pieces of information including the pickup image information of the object as input information to store the pickup image information of the object in the predetermined storing unit, wherein the pickup image acquiring means interlocks the display control means and the input control means to acquire the face pickup image information of the object corresponding to the image pasting area of the face texture from the pickup image information of the object stored in the predetermined storing unit on the basis of the selected face arrangement guide information selected from the plurality of pieces of face arrangement guide information while displaying the plurality of pieces of face arrangement guide information and the input pickup image information of the object on the display unit.

7. The character generating system according to claim 1, wherein the computer further includes
   display control means that controls the display unit to display a plurality of pieces of face arrangement guide information representing arrangements of predetermined face parts and the object on the display unit, and
   image pickup control means that controls an image pickup unit to photograph the object and stores the pickup image information of the object in the predetermined storing unit, and
   the pickup image acquiring means interlocks the display control means and the image pickup control means, picks up an image of the object on the basis of selected face arrangement guide information selected from the plurality of pieces of face arrangement guide information and having a face matched with the face of the object while displaying the plurality of pieces of face arrangement guide information and the object on the display unit, and acquires the face pickup image information of the object corresponding to the image pasting area of the face texture from the pickup image information of the object stored in the predetermined storing unit on the basis of the selected face arrangement guide information.

8. The character generating system according to claim 7, wherein the pickup image acquiring means causes the image pickup control means to adjust a white balance and an exposure on the basis of an image pickup environment of the object such that the pickup image information of the object the image of which is picked by the image pickup control means is the bright pickup image information.

9. The character generating system according to claim 7, wherein the face parts include at least eyes, a nose, a mouth, and a face profile.

10. The character generating system according to claim 1, wherein the computer further includes input control means that controls an input unit to input various pieces of information including the pickup image information of the object as input information to store the pickup image information of the object in the predetermined storing unit, wherein the pickup image acquiring means interlocks the display control means and the input control means to acquire the face pickup image information of the object corresponding to the image pasting area of the face texture from the pickup image information of the object stored in the predetermined storing unit on the basis of the selected face arrangement guide information selected from the plurality of pieces of face arrangement guide information while displaying the plurality of pieces of face arrangement guide information and the input pickup image information of the object on the display unit.

11. A character generating method that generates a face of character displayed on a display unit as a presence in a virtual space by using a computer on a basis of face pickup image information of an object, wherein
the computer includes:
  (a) a step of acquiring the face pickup image information of the object corresponding to an image pasting area of a face texture of the character from pickup image information of the object stored in a predetermined storing section;
  (b) a step of replacing information in an entire area of the face texture with the face pickup image information of the object acquired in the step (a), when all pixels in a predetermined correction area near a profile portion of the face texture are defined as target pixels, calculating color information of each of the target pixels on the basis of color information of a predetermined number of pixels, except for the target pixel, serially arranged from the target pixel in the predetermined region, and generating the face texture in which the color information of the target pixels is replaced with calculated color information; and
  (c) a step of pasting a head portion texture having the face texture generated in the step (b) as a portion to a head portion shape model of the character.

12. The character generating method according to claim 11, wherein the correction area includes a first correction area set near an upper profile portion and a lower profile portion of the face texture, a second correction area set near any one of side-surface profile portions of the face texture, and a third correction area set near the side-surface profile portion opposing the second correction area, and
the step (b) includes
  a step (b1) of, when all the pixels in the correction area are defined as the target pixels, setting first correction color information obtained by calculating an average value of color information of all the pixels, except for the target pixels, which surround the target pixels in a predetermined region as color information of the target pixel, and
  a step (b2) of, when all the pixels in the second correction area and the third correction area are defined as the target pixels, setting second correction color information obtained by calculating an average value of the first correction color information of the predetermined number of pixels except for the target pixels serially arranged from the target pixels toward the side-surface profile portions as color information of the target pixels.

13. The character generating method according to claim 12, wherein the computer further includes
before the step (a), a step (d) of picking up an image of the object on the basis of selected face arrangement guide information selected from the plurality of pieces of face arrangement guide information and having a face matched with the face of the object while displaying the plurality of pieces of face arrangement guide information representing arrangements of predetermined face parts and the object on the display unit and storing the pickup image information of the object in the predetermined storing unit, and
in the step (a), on the basis of the selected face arrangement guide information, the face pickup image information of the object corresponding to the image pasting area of the face texture from the pickup image information of the object stored in the predetermined storing unit.

14. The character generating method according to claim 13, wherein, in the step (d), a white balance and an exposure are adjusted on the basis of an image pickup environment of the object such that the pickup image information of the object the image of which is picked is the bright pickup image information.

15. The character generating method according to claim 13, wherein the face parts include at least eyes, a nose, a mouth, and a face profile.

16. The character generating method according to claim 12, wherein
the computer includes,
before the step (a), a step (e) of inputting the pickup image information of the object to store the pickup image information in the predetermined storing unit, and
in the step (a), the face pickup image information of the object corresponding to the image pasting area of the face texture is acquired from the pickup image information of the object stored in a predetermined storing unit on the basis of the selected face arrangement guide information selected from the plurality of pieces of face arrangement guide information while displaying a plurality of pieces of face arrangement guide information representing arrangements of predetermined face parts and the pickup image information of the object input in step (e) on the display unit.

17. The character generating method according to claim 11, wherein the computer further includes
before the step (a), a step (d) of picking up an image of the object on the basis of selected face arrangement guide information selected from the plurality of pieces of face arrangement guide information and having a face matched with the face of the object while displaying the plurality of pieces of face arrangement guide information representing arrangements of predetermined face parts and the object on the display unit and storing the pickup image information of the object in the predetermined storing unit, and
in the step (a), on the basis of the selected face arrangement guide information, the face pickup image information of the object corresponding to the image pasting area of the face texture from the pickup image information of the object stored in the predetermined storing unit.

18. The character generating method according to claim 17, wherein, in the step (d), a white balance and an exposure are adjusted on the basis of an image pickup environment of the object such that the pickup image information of the object the image of which is picked is the bright pickup image information.

19. The character generating method according to claim 17, wherein the face parts include at least eyes, a nose, a mouth, and a face profile.

20. The character generating method according to claim 11, wherein the computer includes, before the step (a), a step (e) of inputting the pickup image information of the object to store the pickup image information in the predetermined storing unit, and in the step (a), the face pickup image information of the object corresponding to the image pasting area of the face texture is acquired from the pickup image information of the object stored in a predetermined storing unit on the basis of the selected face arrangement guide information selected from the plurality of pieces of face arrangement guide information while displaying a plurality of pieces of face arrangement guide information representing arrangements of predetermined face parts and the pickup image information of the object input in step (e) on the display unit.

* * * * *